United States Patent Office 2,773,232
Patented Dec. 4, 1956

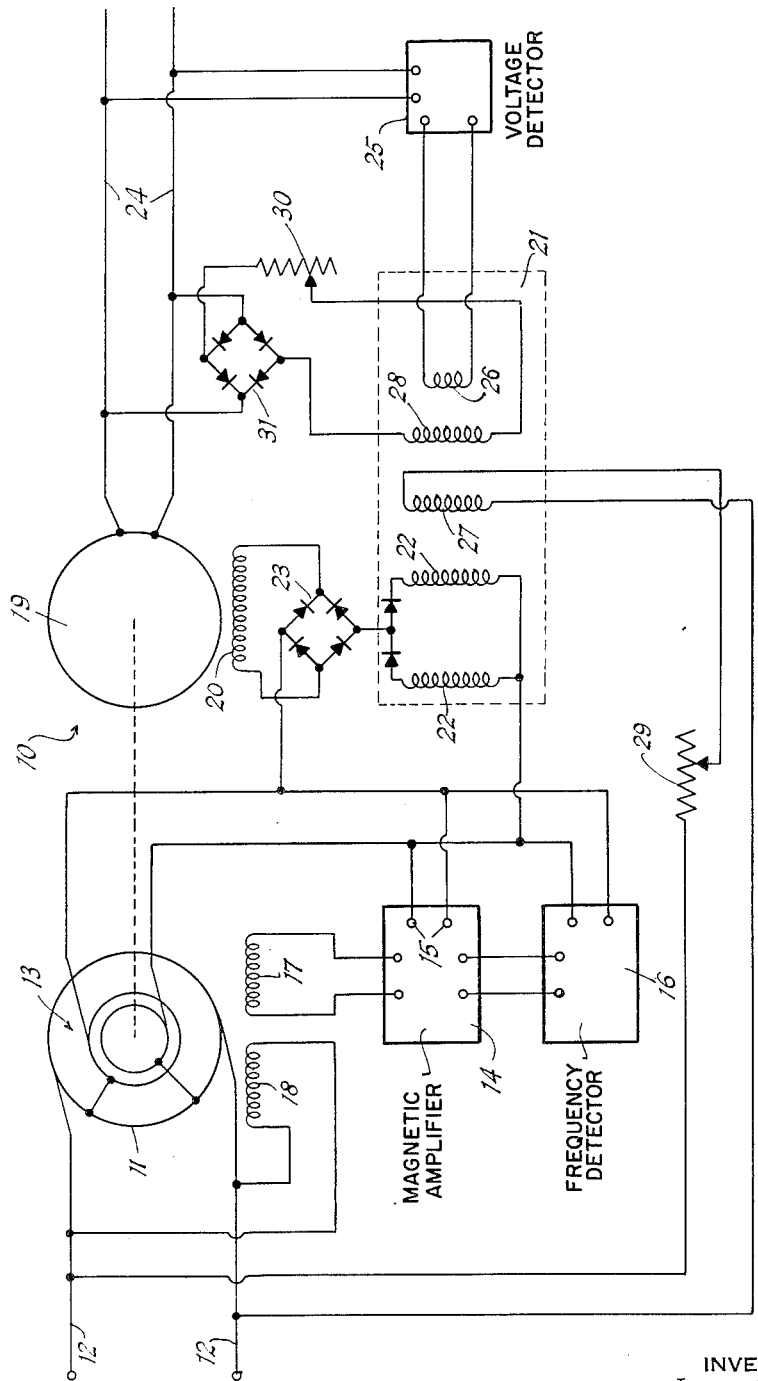

2,773,232

MOTOR GENERATOR SET

John A. Herbst, Montville, and Warren J. Dornhoefer, Woodcliff Lake, N. J., assignors to Bogue Electric Manufacturing Co., Paterson, N. J., a corporation of New Jersey Application May 11, 1954, Serial No. 428,925

3 Claims. (Cl. 322—16)

This invention relates to motor generator sets, motors and controls therefor.

An object of this invention is to provide a direct current motor-alternating current generator set wherein the power for energizing the regulating fields of the respective machines is derived from the supply line directly, rather than from the alternating current machine, thereby allowing a reduction in the size of the machines.

Another object of this invention is to provide a direct current motor-alternating current generator set with a magnetic amplifier control which permits the motor speed to remain constant despite short circuit conditions in the generator output.

A further object of this invention is to provide a system of the character described, where power for exciting the generator field under short circuit conditions is always available without the need for bulky current transformers.

Still another object of this invention is to provide a system of the character described where the alternating current machine will build up its output voltage without the need for flashing means either for initial starts or after short circuit during operation.

Yet another object of this invention is to provide a direct current motor with a magnetic amplifier control for maintaining the speed of the motor at a constant value without the necessity for a separate supply of alternating current.

Yet a further object of this invention is to provide a system of the character described wherein the power supply for the amplifier regulating the alternating current generator is derived from the direct current line which eliminates variation in said power supply under transient conditions of operation and thus simplifies the problem of stability of operation.

Still a further object of this invention is to provide a system of the character described wherein the power supply for the amplifier regulating the alternating current generator is constant, thereby substantially reducing transient dips and overshoots with load application and removal.

Other objects of this invention will in part be obvious and in part hereafter pointed out.

In the drawing, the figure represents by schematic diagram the circuit of a control system embodying the invention.

A system embodying the instant invention comprises essentially a direct current motor, which includes a pair of slip rings to provide an alternating current output. The frequency of such output is sensed and constitutes an input for a magnetic amplifier which is powered by the alternating current output of the motor. The output of the amplifier is supplied to a regulating field winding of the motor to provide the desired speed control.

When the direct current motor drives an alternator, the alternating current output of the motor also energizes a second magnetic amplifier which receives a signal from a voltage detector sensing the alternator output, the amplifier output controlling the generator field to maintain the alternator voltage constant despite variations in the load.

The amplifier regulating the alternator is further provided with a pair of control windings which are respectively energized from the direct current line of the motor and the rectified alternator output, such windings being arranged to buck each other out in the absence of short circuit conditions and when the alternator terminal voltage is normal; however, with short circuit conditions and no voltage in the alternator output, the direct current control winding is operative to limit the current output to a safe value.

Referring in detail to the drawing, 10 designates a motor generator system embodying the invention. The same comprises a direct current motor 11 energized from a direct current line 12. The motor 11 is provided with a pair of slip rings 13 associated with the armature thereof, from which an alternating current output is derived.

The alternating current output from slip rings 13 powers a magnetic amplifier generally indicated at 14 with power input terminals at 15. The frequency of the alternating current output is sensed by a frequency detector generally indicated at 16, the output of said detector providing an input signal for amplifier 14, whose output is supplied to a regulating field winding 17 of the motor 11, thereby maintaining the motor speed at a constant value.

The frequency detector 16 may take various forms known in the art, as for example the two tuned circuit type where one circuit is tuned to a frequency higher than the desired frequency and the other circuit is tuned to one lower than the desired frequency. The input signal is applied to the two circuits in parallel and the outputs rectified and connected to the input of the amplifier in such a manner that as the output of the higher frequency tuned circuit increases, the excitation of the motor is increased causing a decrease in motor speed, while an increase in the output of the lower frequency tuned circuit causes a decrease in motor excitation and consequent increase in motor speed.

Another form of frequency detector has a single tuned circuit which is tuned exactly to the desired frequency. Such a circuit reverses the phase of its output as it goes through resonance, being inductive or lagging at frequencies below resonance and capacitive or leading at frequencies above resonance. Such variable phase output is applied to a phase discriminator which gives a positive output for frequencies below resonance and a negative output for frequencies above resonance, and thus controlling the motor field.

If desired, the motor 11 may be provided with an additional field winding 18 which is energized directly from line 12. The windings 17, 18 may be arranged in either buck or boost relationship to achieve the desired excitation and control.

The motor 11 may drive an alternator 19 having a field winding 20. A second magnetic amplifier, generally indicated at 21, is operative to regulate the alternator output voltage. The amplifier 21 includes power windings 22 and a full wave rectifier 23 of the bridge type, in circuit with the motor slip rings 13 and the generator field winding 20 for energizing the same.

The voltage of the alternator output at lines 24 is sensed by a voltage detector generally indicated at 25, which provides an input signal for a control winding 26 of amplifier 21. In this manner, the alternator field 20 is regulated to maintain the output voltage in lines 24 constant despite changes in the load.

The voltage detector 25 may take various forms known in the art including the type having a saturable reactor operating in the region where its current varies only slightly with changes in voltage, such current being compared magnetically in the amplifier input with a current passing through a resistor, the latter current varying linearly with changes in the input voltage. Another form of voltage detector utilizes a constant voltage transformer providing a reference voltage for comparison with the output voltage either by magnetic comparison in the input winding of the amplifier or electrically by means of a resistance network.

The amplifier 21 further includes additional control windings 27, 28 which are particularly adapted for coping with short circuit conditions in the alternator output. Winding 27 with a series resistor 29 in circuit therewith, is energized from the direct current line 12 while winding 28 with a series resistor 30 and a bridge type rectifier 31 in circuit therewith, is energized from the alternating current lines 24.

In the absence of control windings 27, 28 if a short circuit should occur in the load circuit of the alternator, the voltage regulator would attempt to maintain voltage and therefore operate to the maximum of its power capacity. This would create dangerous operating conditions for the alternator.

However, resistor 29 is set so that with conditions of no voltage in the alternator output, the short circuit current is automatically limited to a safe value through the operation of control winding 27. Furthermore, when there is no short circuit in the alternator output and the voltage at the alternator terminals is normal, the resistor 30 is set to allow control winding 28 to buck out winding 27, thereby placing the alternator at its optimum operating conditions.

It is apparent that the direct current motor 11, which operates at a constant speed, may be used for driving various pieces of rotating mechanical or electrical equipment having a constant speed requirement, including direct current generators.

Furthermore, with the direct current motor driving an alternator, as described, the regulator for the alternator is made more effective with its power supply coming from the direct current line. With conventional regulators powered from the alternator output, the application or removal of large loads results in a substantial decrease or increase in the terminal voltage of the alternator, producing in turn variations in the input signal to the amplifier. The attempt of the amplifier to quickly supply power which will restore the alternator voltage to a proper value occurs at the instant when the power input to the regulator has deviated substantially from a normal value, thus producing a substantial lag in the regulator response and effecting the stability of operation.

With the system of the instant invention, the amplifier regulating the alternator is not powered from the alternator output and its regulating action is not affected by sudden changes in load. Thus, the regulator operates with increased efficiency, without lag in response and enhances the stability of operation of the system.

As changes could be made in the system described, and other embodiments of this invention could be made without departing from the scope thereof, it is understood that all matter shown and described herein is to be interpreted as illustrated and not in a limiting sense.

Having thus described our invention, we claim as new and desire to protect by Letters Patent:

1. In combination, a direct current motor and an alternator driven by said motor, said motor comprising an armature and slip rings associated therewith for providing an alternating current output, and a field winding, a first magnetic amplifier, frequency detector means for sensing the frequency of said alternating current output and supplying an input signal to said amplifier, said amplifier being energized by said alternating current output and providing an output for energizing said motor field winding, a second magnetic amplifier including a power winding in circuit with said alternating current output and the field winding of said alternator, and a control winding, voltage detector means for sensing the voltage of the alternator output and supplying an input signal to said last mentioned control winding.

2. The combination as in claim 1 wherein said second amplifier further includes second and third control windings, a direct current source for energizing said motor, circuit means including a series resistor connecting said second control winding with said direct current source, and circuit means including rectifier means connecting said third control winding with the alternator output, said second and third control windings being operative to buck each other out under normal voltage conditions in said alternator output, said second control winding being operative in response to no voltage conditions of said alternator output to limit the short circuit current.

3. A constant speed direct current motor, a direct current source for energizing said motor, an alternator mechanically coupled to said motor, a pair of magnetic amplifiers having their outputs in circuit respectively with the field windings of said motor and alternator, means for deriving an alternating current from said motor, circuit means for supplying power from said alternating current for each of said amplifiers, circuit means for sensing the frequency of said alternating current and supplying an input signal to the amplifier associated with said motor for regulating the output of said amplifier, and voltage detector means for sensing the voltage of the alternator output and supplying an input signal to the amplifier associated with said alternator for regulating the output of said last mentioned amplifier.

References Cited in the file of this patent

UNITED STATES PATENTS

| 1,663,890 | Stoller | Mar. 27, 1928 |
| 2,111,423 | Given | Mar. 15, 1938 |
| 2,157,834 | Schmidt | May 9, 1939 |